United States Patent Office 3,244,528
Patented Apr. 5, 1966

3,244,528
DRIED HONEY-MILK PRODUCT
David Torr, Ripley Lane, Oyster Bay, N.Y.
No Drawing. Filed Mar. 3, 1965, Ser. No. 436,948
11 Claims. (Cl. 99—56)

This invention relates to food products and more particularly to the preparation of a dry, powdered, unadulterated honey-milk composition of non-hygroscopic character and which is capable of being used or stored while exposed to relatively high moisture-containing atmospheres without reversion of the honey constituent to the objectionably sticky form and without agglomeration or caking of the product.

The products produced in accordance with the present invention are satisfactorily utilized with hot or cold cereals either coated with the product or where the dried honey-milk powder is furnished in a separate package, the addition of water being all that is required; with candies, e.g., honey-milk bars, etc.; cookies and cooky mixes; cake mixes; chocolate quick drinks; coffee and tea mixes for hotel and motel rooms; cocoa mixes; ice cream; instant puddings and pie fillings; instant desserts; carbonated and non-carbonated drinks; fruit flavored drinks, e.g., cherry and strawberry milkshakes; health and dietetic foods; ingredient for peanut butter for sweetner and smooth spreading and; bakery goods, e.g., breads, rolls, etc. The products will be desirably utilized in national school lunch programs; by the armed services; by United Nations organizations and the World Health Organization, etc.

Fresh milk and natural honey are readily miscible in all proportions to form compositions that are both tasty and healthful. Such mixtures of milk and honey are high in energy value and it is believed that the normal honey acids contribute favorably to the digestibility of milk proteins. Further, the inclusion of honey in the diet has a definite beneficial effect upon the retention of calcium by infants. Also, honey has been found to be of unusual value when used as the carbohydrate component of infant diets. Honey has been found to be among the best of the carbohydrates with respect to the speed with which sugars are assimilated, and it appears to be the best carbohydrate with respect to the length of time a moderately high level of blood sugars is maintained.

Heretofore, attempts have been made to solidify honey-milk mixtures, viz. Barwell U.S. Patent No. 1,409,435, or honey, viz. Straub, U.S. Patent No. 2,693,420, but in either of the methods disclosed therein the addition of a desiccant has been required. Straub, e.g., employs wheat flour, corn starch, rice starch, potato starch, tapioca starch, etc., as his moisture-absorbing medium. The justification offered for the use of this adulterant in the powdered honey product was that since the product was intended for baking, the starch normally useful in baking, would not be useless or undesirable when the product is employed for baking or like purposes.

The dried honey-milk product, however, produced in accordance with my discovery disclosed herein, while useful in the preparation of bakery and confectionery products, is, as previously herein-stated, further advantageously useful to sweeten and flavor coffee or tea in the brewed or instant form, desserts, cereals, peanut butter, ice cream and other food and drink preparations where honey and milk are essentially desirable in their pure, unadulterated state.

A further object of the present honey-milk product resides in the provision of a powdered, substantially white product which, although appearing like flour or powdered starch, is free of such adulterants and which, notwithstanding the absence thereof, will remain powdered and uncaked in unexpected defiance of the normal deliquescent property of honey.

Another object of the instant invention is to provide a protein-nutritious food product which can be marketed in non-hermetically sealed containers similarly to the manner in which granulated sugar is packaged and which can be used in the household as a tasteful and conveniently applicable sweetener preferably in lieu of or in addition to sugar.

Other objects and advantages of my hereindisclosed invention will be set forth in part hereinafter and in part will be obvious herefrom, or may be learned by practice of the invention, the same being realized and attained by means of procedures defined and pointed out in the appended claims.

In the process disclosed by Webb et al. U.S. Patent No. 2,621,128, for preparing a dried honey-milk product, the exclusion of water throughout the process is emphasized as the desideratum. Accordingly, commercial honey with a moisture content of less than about 18% is slowly drizzled onto dried skim milk, dried whole milk, dried buttermilk or dried whey. The combined mixture is allowed to stand for 16–24 hours at 50° F. to 110° F. to cause the water in the honey to be sequestered by combining with the lactose and dextrose present to form crystalline sugar hydrates. This product is then dried to a moisture content not substantially in excess of 10 percent and the dried mixture is then pulverized.

It is well known that the product prepared in accordance with the Webb et al. teaching contains the water originally in the honey and dry milk though some of it hydrates the lactose and is more or less at equilibrium with 60% relative humidity at this point. The product in its driest form can be milled to a powder in air of controlled humidity. Dry air is required because the dried product is quite hygroscopic and if permitted to stand in moist air will revert to its original moisture content or more, dependng upon the RH of the air. Thus, unless hermetically packaged in the presence of a desiccant or kept in a controlled low humidity atmosphere, the product cakes up, turns color and becomes impracticable to handle.

Contrary to previous procedural efforts to obtain shelf-stable, non-caking, dry honey-milk products, the present invention involves the addition of water rather than the exclusion thereof prior to the final dehydration step. Where, e.g., powdered milk products are utilized, such products are reconstituted with water prior to being combined with the honey, or water is added after the powdered milk and honey are combined. Or, where fresh whole milk products, which already contain water are used, neither starch nor other desiccants are required to be added. It has been discovered, therefore, that the addition of water in quantities beyond that normally present in commercial honey will advantageously advance the extent of dehydration achievable for a honey-milk mixture, and further advantageously minimize any hygroscopic properties otherwise exhibited by such mixtures after drying. Similarly, I have discovered that the water already present in whole milk products, when combined with the moisture already present in honey, will permit drying of such honey-milk mixtures to degrees heretofore unattainable and to degrees of chemical stability also heretofore unattainable.

Whether dried or fresh whole milk, skim milk, buttermilk, whey, or mixtures of the foregoing were mixed with honey, the presence of or addition of water beyond that already present in the honey, appeared to contribute to the stability of the finally obtainable dried composition.

The moisture content of commercially available honeys ranges between approximately 13 and 26 percent.

Any commercial honey of good grade can be used in practicing my process.

The following examples are given as illustrative embodiments of manners in which may invention may be practiced. It will be understood that various conventional drying techniques may be employed, such as spray, tunnel, freeze or oven drying, the criticality of the invention being the presence of moisture in excess of that contained in honeys of even the highest natural moisture content.

*Example I*

A honey-milk solution at room temperature, having a 30% solids concentration was prepared, said solution containing 197 grams of honey (80%), 52.5 grams of powdered whole milk and 450.5 grams of water. The solution after being freeze-dried yielded a fluffy, white, shelf-stable, non-caking, 75:25 honey-milk food product weighing 200 grams. The moisture content was determined to be less than 2%.

*Example II*

A honey-milk solution at room temperature having a 30% solids concentration was prepared, said solution containing 28.1 grams of honey and 67.5 grams of whole milk powder. The solution after being freeze-dried yielded a fluffy product as appeared in Example I and weighing 100 grams. The product contained 25% honey and 75% whole milk solids. Moisture content: less than 2%.

*Example III*

A honey-milk solution at room temperature having a 30% solids concentration was prepared as in the foregoing examples, said solution containing 56.2 grams of honey and 45 grams of whole milk powder. The solution was freeze-dried to yield a desirable food product of the aforedescribed character and weighing 100 grams. The product contained a honey-milk ratio of 50:50.

The above procedures were repeated using a spray dryer and the same results were obtained.

*Example IV*

A honey-milk solution at room temperature, comprised of 75 grams of honey (approximately 18% moisture content), 25 grams of powdered whole milk and 5 grams of water was prepared. The solution was freeze-dried and a white, fluffy, shelf-stable product was obtained.

*Example V*

A mixture at room temperature, containing 100 grams of honey (approximately 18% moisture content) and 100 grams of fresh whole half-milk and half cream was prepared. The solution was spray-dried and yielded the desirable non-caking, shelf-stable product as obtained in the foregoing procedures.

In carrying out the above process using the freeze-drying technique, the conditions were as follows: The prepared honey-milk solution was allowed to freeze for 2 hours at −45° C.; the drying time, 12–18 hours; the pressure, 70–100 microns of mercury; shelf temperature, 125° F.; ambient temperature, 85°–90° F.; condensate plate temperature, −40° F.; and product temperature, 125° F. maximum.

Where spray drying was utilized, the conditions were as follows: The inlet temperature, 120°–135° C.; outlet temperature, 65°–85° C.; atomizer pressure, 5 kg. per cm.$^2$; drying rate of solution, 25–35 ml. per minute; and product temperature 55°–75° C.

In addition to the foregoing preferable drying techniques, tunnel, drum, vacuum evaporation, crystallization, foam and instantizer drying methods may suitably be utilized. The initial honey-milk-water mixture prior to drying may be maintained at any reasonable temperature ranging between 32°–110° F. The period of time between the mixing and drying step is of no consequence and drying may be accomplished promptly after the mixture is prepared.

The obtention of the valuable products in the manner disclosed herein, is due to the inclusion of water with the honey and milk prior to the drying procedure. By the inclusion of water I mean the presence of water in addition to the moisture content of the honey in its natural form. Contrary to the teachings of the prior art, therefore, where the moisture present in the honey-milk mixture is reduced to the minimum prior to the drying step, I have found that the inclusion of such additional water is responsible for the beneficial result achievable in the practice of my invention. Although the preparation of a usable non-caking dried honey-milk product may be prepared by including somewhat less than ten percent of water by weight (approximately 5% as shown in Example IV) prior to drying the mixture using a suitable drying procedure, it is believed that the at least approximately ten percent water should be present, said water being, as stated, additional to the inherent moisture content of the honey. Thus, where whole fresh milk is used, the water requirement is readily satisfied and has performed, in fact, as well as where I have begun with dried whole milk products and have, with the addition of water, reconstituted such products. A water content of over ninety percent prior to drying has produced satisfactory results. It will be appreciated that where the temperature of the honey-milk-water mixture is raised above room temperature whereby the viscosity of the mixture is reduced, spray-drying of said mixture is further facilitated, especially where the honey to milk ratio is high.

As expressed hereinabove, the unexpected results achieved in the manner disclosed herein, appears to be predicated upon the inhibition of the transformation of the amorphous milk sugar contained in milk products into crystalline lactose hydrate, such transformation normally occurring upon contact of the amorphous milk sugar with honey. Accordingly, it appears that the water added to the dried milk or the water present in the whole fresh milk products precludes such crystallization prior to the drying procedure, and that such preclusion advantageously allows the drying procedure to proceed to a greater and beneficial conclusion.

As aforementioned, other dried honey-milk products are produced in an analogous manner by using dried or fresh whole milk, buttermilk, skim milk, whey, cream and milk, etc. Although iodizing caking inhibitors or desiccant additives are not required in view of the substantially non-hygroscopic nature of the dry products herein obtained, antioxidants or fat stabilizers may be suitably added in small quantities (0.01–1.00% by weight) to prevent rancidity occurring in the facts that may be present in the product. Examples of such antioxidants are: butylated hydroxyanisole, butylated hydroxytoluene, certain of the tocopherols and combinations of the foregoing with citric acid and n-propyl gallate. Also, for better utilization of the calcium in the milk, vitamin D may be added.

Further, it will be appreciated that the period of time for which the honey-milk solution stands before drying is commenced, appears inconsequential insofar as concerns the satisfactory fulfillment of the invention. That is, drying of the solution may be accomplished immediately following the preparation thereof or many hours later without detriment to the process.

The ratio of honey solids to milk solids in my products may be varied within wide limits. Satisfactory products are obtained with a honey solids—milk solids ratio within the range of approximately 10:90 to 75:25.

The invention in its broader aspects is not limited to the specific steps, methods and compositions described but departures may be made therefrom within the scope of the accompanying claims without departing from the principles of the invention and without sacrificing its chief advantages.

What is claimed is:

1. A process for the prevention of a dried honey-milk product containing approximately 2% moisture which comprises forming a mixture of honey, a dried milk product and water, the weight ratio of the honey and milk being about 10 to 75 parts honey solids to about 90 to 25 parts milk solids, said water being in an amount at least 5% in excess of the natural moisture content of honey, the temperature during the formation of the mixture being within the range of about 32° to 110° F., and drying the mixture.

2. A process for the preparation of a dried honey-milk product which comprises forming a mixture of honey, a dried milk product and water, the weight ratio of the honey and milk being about 10 to 75 parts honey solids to about 90 to 25 parts milk solids, said water being in an amount at least 5% in excess of the natural moisture content of the honey, and drying the mixture.

3. A process for the preparation of a dried honey-milk product which comprises forming a mixture of honey, a milk product of the group consisting of dried whole milk, dried skim milk, dried buttermilk, dried whey, mixtures of the foregoing, and water, said water being in an amount at least 5% in excess of the natural moisture content of the honey, the weight ratio of the honey and milk being about 10 to 75 parts honey solids to about 90 to 25 parts milk solids, and drying the mixture to form a dried honey-milk product which is non-caking and shelf-stable.

4. A process according to claim 3 wherein the product contains approximately 2% moisture.

5. A process according to claim 3 wherein the mixture is freeze-dried.

6. A process according to claim 3 wherein the mixture is spray-dried.

7. A process for the preparation of a dried honey-milk product which comprises forming a mixture of honey and whole fresh milk, the weight ratio of the honey and milk being about 10 to 75 parts honey solids to about 90 to 25 parts milk solids, and drying the mixture.

8. A process for the preparation of a dried honey-milk product containing approximately 2% moisture which comprises forming a mixture of honey and whole fresh milk, the weight ratio of the honey and milk being about 10 to 75 parts honey solids to about 90 to 25 parts milk solids, the temperature during the formation of the mixture being within the range of about 32° to 110° F., and drying the mixture.

9. A process for the preparation of a dried honey-milk product which comprises forming a mixture of honey and milk products selected from the group consisting of whole fresh milk, whole fresh milk and cream, whole skim milk, whole buttermilk, whole whey and mixtures of the foregoing, the weight ratio of the honey and milk being about 10 to 75 parts honey solids to about 90 to 25 parts milk solids, and drying the mixture.

10. A process for the preparation of a dried honey-milk product which comprises forming a mixture of honey and a milk product selected from the group consisting of whole fresh milk, whole fresh milk and cream, whole skim milk, whole buttermilk, whole whey and mixtures of the foregoing, the weight ratio of the honey and milk being about 10 to 75 parts honey solids to about 90 to 25 parts milk solids, the temperature during the formation of the mixture being within the range of about 32° to 110° F., and freeze drying the mixture.

11. A process for the preparation of a dried honey-milk product which comprises forming a mixture of honey and a milk product selected from the group consisting of whole fresh milk, whole fresh milk and cream, whole skim milk, whole buttermilk, whole whey and mixtures of the foregoing, the weight ratio of the honey and milk being about 10 to 75 parts honey solids to about 90 to 25 parts milk solids, the temperature during the formation of the mixture being within the range of about 32° to 110° F., and spray-drying the mixture.

References Cited by the Examiner

UNITED STATES PATENTS 2,292,447   8/1942   Irwin _____ 99—199

FOREIGN PATENTS 705,059   3/1954   Great Britain.

OTHER REFERENCES

Turkot et al.: Food Technology, 1960, vol. 14, No. 8, pp. 387–390.

A. LOUIS MONACELL, *Primary Examiner.*